United States Patent [19]

Spatola

[11] 4,350,502
[45] Sep. 21, 1982

[54] METHOD AND APPARATUS FOR DECONTAMINATING GAS VENTED FROM LAND FILL AND FUGITIVE SOURCES

[76] Inventor: Joseph A. Spatola, 2431 Bryant Ave., Westfield, N.J. 07090

[21] Appl. No.: 192,472

[22] Filed: Sep. 30, 1980

[51] Int. Cl.³ .............................................. B01D 53/04
[52] U.S. Cl. .......................................... 55/74; 55/309; 55/387; 210/188
[58] Field of Search ....................... 55/71, 74, 309, 311, 55/387, 389; 210/170, 188, 433.1

[56] References Cited

U.S. PATENT DOCUMENTS

| | | | |
|---|---|---|---|
| 154,645 | 9/1874 | Chase | 55/387 X |
| 1,818,702 | 8/1931 | Flowers | 210/433.1 X |
| 2,294,183 | 8/1942 | Holm-Hansen | 55/387 X |
| 2,589,229 | 3/1952 | Dauphinee | 55/387 X |
| 2,594,108 | 4/1952 | Woodbridge | 55/387 X |
| 3,067,560 | 12/1962 | Parker | 55/387 X |
| 3,429,103 | 2/1969 | Taylor | 55/71 |
| 3,475,885 | 11/1969 | Kline | 55/387 X |
| 3,712,030 | 1/1973 | Priest | 55/387 X |
| 3,744,976 | 7/1973 | Tongue | 55/71 X |
| 4,040,802 | 8/1977 | Deitz et al. | 55/71 |

OTHER PUBLICATIONS

AICHE Symposium Series 188, vol. 75, 1979, Licht et al., Editors, pp. 233-246.
Thermo-Systems Inc., Instruction Manual Model 3062 Diffusion Drier, five pages.

*Primary Examiner*—Robert H. Spitzer
*Attorney, Agent, or Firm*—Martha G. Pugh

[57] ABSTRACT

Gas from one or more land fill vents, or other fugitive sources containing toxic materials, is decontaminated by being passed through a wire mesh tube disposed coaxially in an enclosing housing. The annular chamber between the wire mesh tube and enclosing housing is filled with solid adsorbent, such as conventional activated carbon, or specially impregnated varieties designed to remove selected contaminants. The decontamination is effected by radial diffusion of the toxic constituents in a laminar flow regime. The annular chamber is sealed at the upper and lower ends with removable annular caps which allow the adsorbent material to be replaced when it is spent. An improved embodiment contains a plurality of wire mesh tubes symmetrically arranged in parallel relation to the axis of a cylindrical housing wherein the intervening space is filled with the solid adsorbent. The housing is held in a substantially vertical position by conventional supporting means. In one embodiment, adapted for land fill use, each of the wire mesh tubes is coupled at its lower end to receive gas vented from a corresponding gas vent projecting from the land fill. In a modification, several wire mesh tubes are connected at their input and output ends to provide a single wire mesh channel making numerous passes back and forth through the adsorbing bed before exiting to the atmosphere. Unlike conventional adsorption devices, the contaminated gas stream in the device of the present invention does not come into direct contact with the solid adsorbent.

17 Claims, 6 Drawing Figures

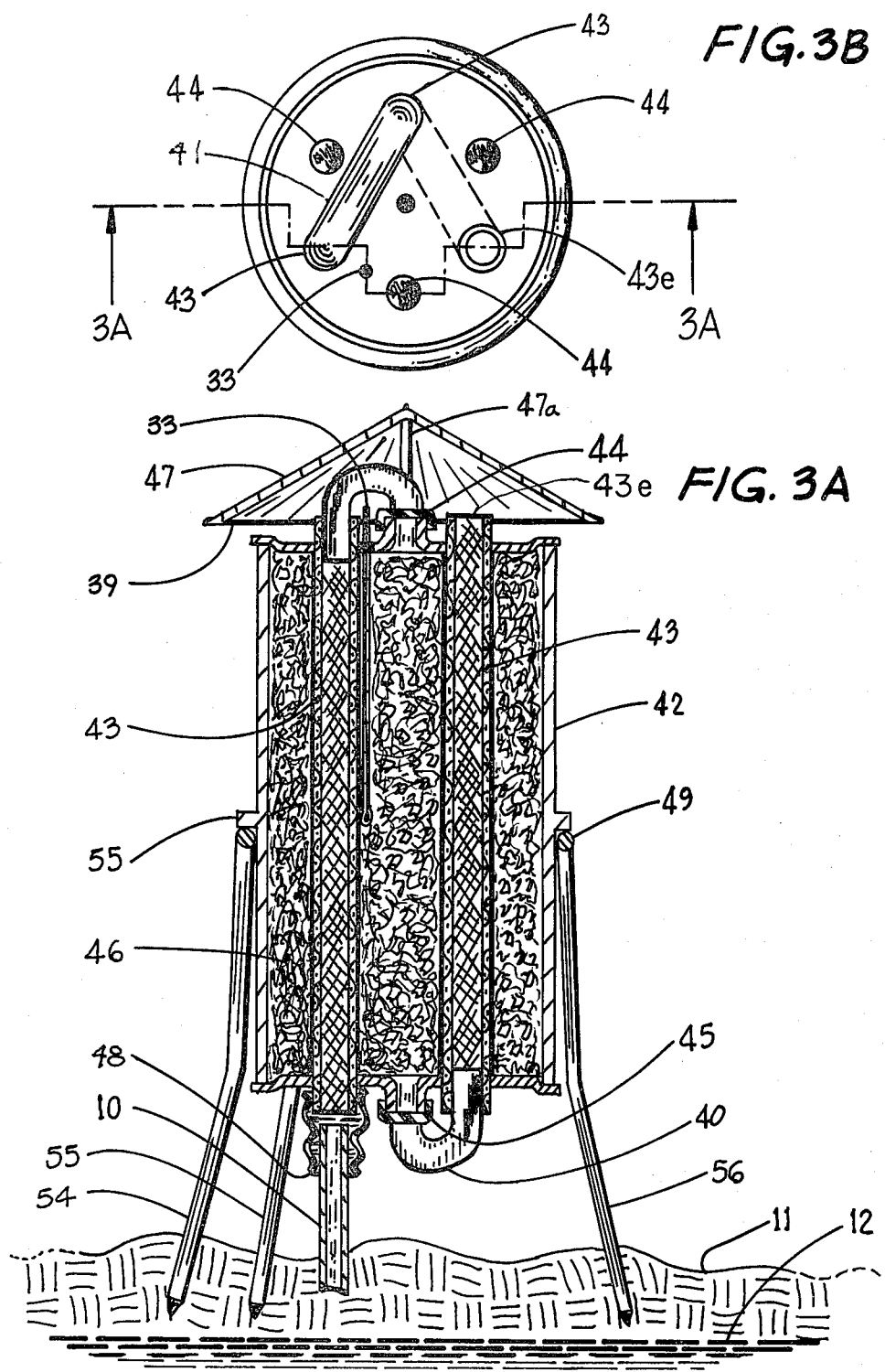

METHOD AND APPARATUS FOR DECONTAMINATING GAS VENTED FROM LAND FILL AND FUGITIVE SOURCES

BACKGROUND OF THE INVENTION

One of the principal ecological problems of the present day arises from the fact that in the many disposal areas throughout the country, a variety of materials, including metals, chemicals and organics, some of which are biodegradable and some of which are not, are dumped in a mixture with natural organic materials, or disposed of in open air dump sites. Because of the large preponderance of decaying organic debris in conventional garbage dumps, methane and other organic gases are generated, carrying with them into the atmosphere contaminants, such as, for example, vinyl chloride, benzene, toluene, carbon tetrachloride, and many other toxic vapors. It has been the practice in sanitary land fills, and in other dump sites in which an attempt is made to manage the effluent gases, to install vent pipes at various locations around the fill, which may extend six or eight feet above the surface and which may extend down to depths just above the water level. These pipes tend to channel the generated gases, including contaminants, permitting them to pass into the atmosphere, and reducing the chance of their ground migration, explosion or spontaneous burning in the fill.

A principal disadvantage of this method of releasing gases into the atmosphere is that the natural organic gases passing into the atmosphere, which may be predominantly methane, may be mixed with various toxic vapors, depending on the types of materials which have been dumped into the land fill or other dump sites. These contaminants may, for example, include carcinogens, such as vinyl chloride, and other of the contaminant vapors mentioned above, which are disseminated into the atmosphere creating potential health hazards.

BRIEF DESCRIPTION OF THE INVENTION

Accordingly, it is the principal object of this invention to provide means for removing undesirable contaminants from gases and vapors passing out of sanitary land fills and other types of refuse dumps, and from other fugitive sources of vapor having low rates of flow.

Another object of the invention is to provide means for selectively removing certain types of contaminants, as opposed to others, from gas passing out of dumps and other fugitive gas sources.

These and other objects are achieved in accordance with the present invention by installing in a position to receive the effluent gases generated in dump sites, or in other types of fugitive gas sources, one or more stripper devices formed from an internal tube of wire mesh surrounded coaxially by a cylindrical housing of steel or some other rigid material. A solid adsorbent material is packed into the annular space between the wire mesh tube and the inner wall of the housing. In this configuration, the contaminated gas stream enters into the wire mesh tube without coming into direct contact with the solid adsorbent. During the process in which the primary gas stream passes axially through this tube, the contaminants diffuse radially through the wire mesh and are removed by the adsorbing material. In a preferred embodiment, the solid adsorbent may comprise, for example, activated carbon of a cross-sectional dimension substantially larger than the interstices of the wire mesh. The activated carbon may be of a conventional type, it may be impregnated with chemicals designed to remove selected pollutants, or it may be composed of reactive granules, as will be discussed in more detail hereinafter. Alternatively, other adsorbing materials can be used, such as, for example, zeolites, or any of the materials known in the art as molecular sieves. The upper and lower ends of the annular housing are equipped with tightly sealed covers, which permit the spent carbon to be removed and replaced.

Any conventional type of supporting means may be employed to couple the stripper device to the fugitive gas source. In the case of a dump site or land fill, this may take the form of a supporting stand having bayonette-type legs which are firmly fixed into the surface of the dump, thereby disposing the stripper device with its principal axis normal to the surface so that a corresponding vent pipe in the dump can be connected by a gas-impervious connector to the lower end of the wire mesh tube. The vented contaminated gas stream enters the lower end of the wire mesh tube in laminar flow, and passes in a substantially unobstructed manner through to the exit. The contaminated vapors diffuse radially through the wire mesh tube and are removed by adsorption onto the activated carbon or other adsorbing material in a manner described by the Gormley-Kennedy equation. Article entitled *Diffusion from a Stream Flowing Through a Cylindrical Tube*, P. G. Gormley and M. Kennedy, *Proceedings of the Royal Irish Academy*, Vol. 52A, pp. 163-169, (1949).

The gas, from which the contaminants have been removed, passes out through the top of the coaxial housing and into the atmosphere. For protection from the weather, a conical cover is supported in coaxial relation to the upper end of the housing, in spaced relation above the top, so that the gas is allowed to escape into the atmosphere around the periphery of the cover.

An improved embodiment of the invention especially adapted for land fill use comprises an enlarged cylindrical housing which encloses, in the present embodiment, three wire mesh tubes arranged in parallel symmetrical relation about the cylinder axis. The intervening space in the housing between the wire mesh tubes is packed with activated carbon or other material for the adsorption of contaminants, as in the previously described embodiment. In this embodiment, each of the wire mesh tubes is connected at one of its ends to a corresponding gas vent interposed into the fill. The upper ends of each of the wire mesh tubes protrude through openings in top of the housing, which, as in the previously described embodiment, has a conical cover to protect it from the weather. Although three wire mesh tubes have been shown by way of example, it will be understood that any number of tubes can be used which is compatible with the size of the enclosing unit and the content of the adsorbing bed of materials interposed in the space between the wire mesh tubes. The housing is closed at both ends except for openings to accommodate the wire mesh tubes and additional openings through which the carbon or similar adsorbent material is placed in or drained out of the housing. This embodiment is supported in substantially normal relation to the surface of the fill with each of the wire mesh tubes in coupled relation to a corresponding gas vent pipe in the land fill. The supporting device for the housing is similar to that for the previously described embodiment, comprising a ring supported by a plurality of legs interposed into the surface of the fill, in which ring a peripheral flange of the housing rests.

In accordance with a further embodiment in which the housing is substantially similar to the previously described embodiment, a plurality of wire mesh tubes (in this case three) is interconnected in series so that only a single pipe is connected to the gas intake means at the lower end of the housing, and a single tube vents to the atmosphere at the upper end. In this manner, the contaminated gas stream makes multiple passes through the device, resulting in decreased contamination in the gas which is ultimately released to the atmosphere.

A principal advantage of the method and apparatus of the present invention is its simplicity, in that it does not require auxilliary pumps or blowers, due to the fact that the stream passing through the device has a substantially lower pressure drop than in most conventional adsorbing systems.

Another advantage of the system of the present invention is that the activated carbon can be impregnated with chemicals designed to remove specific pollutants.

Furthermore, the effectiveness of this device is not reduced by the presence of entrained particles in the contaminated gas which tend to reduce the number of active sites available for adsorption on the adsorbing material. This occurs because of the fact that the primary gas stream emanating from the land fill vent does not come into direct contact with the adsorbing material.

These, and other objects, features and advantages, will be apparent from a study of the specification and claims hereinafter with reference to the attached drawings.

SHORT DESCRIPTION OF THE DRAWINGS

FIGS. 3A and 3B show, in longitudinal and cross-section, a further modification of the land fill application of the present invention in which a plurality of wire mesh tubes through the activated charcoal bed are interconnected at their upper and lower ends so as to provide a single multiple-pass path through the device having a single connection at its lower end for receiving gas from a vent pipe in the fill, and single vent at its upper end for expelling gas to the atmosphere.

Figure 4:
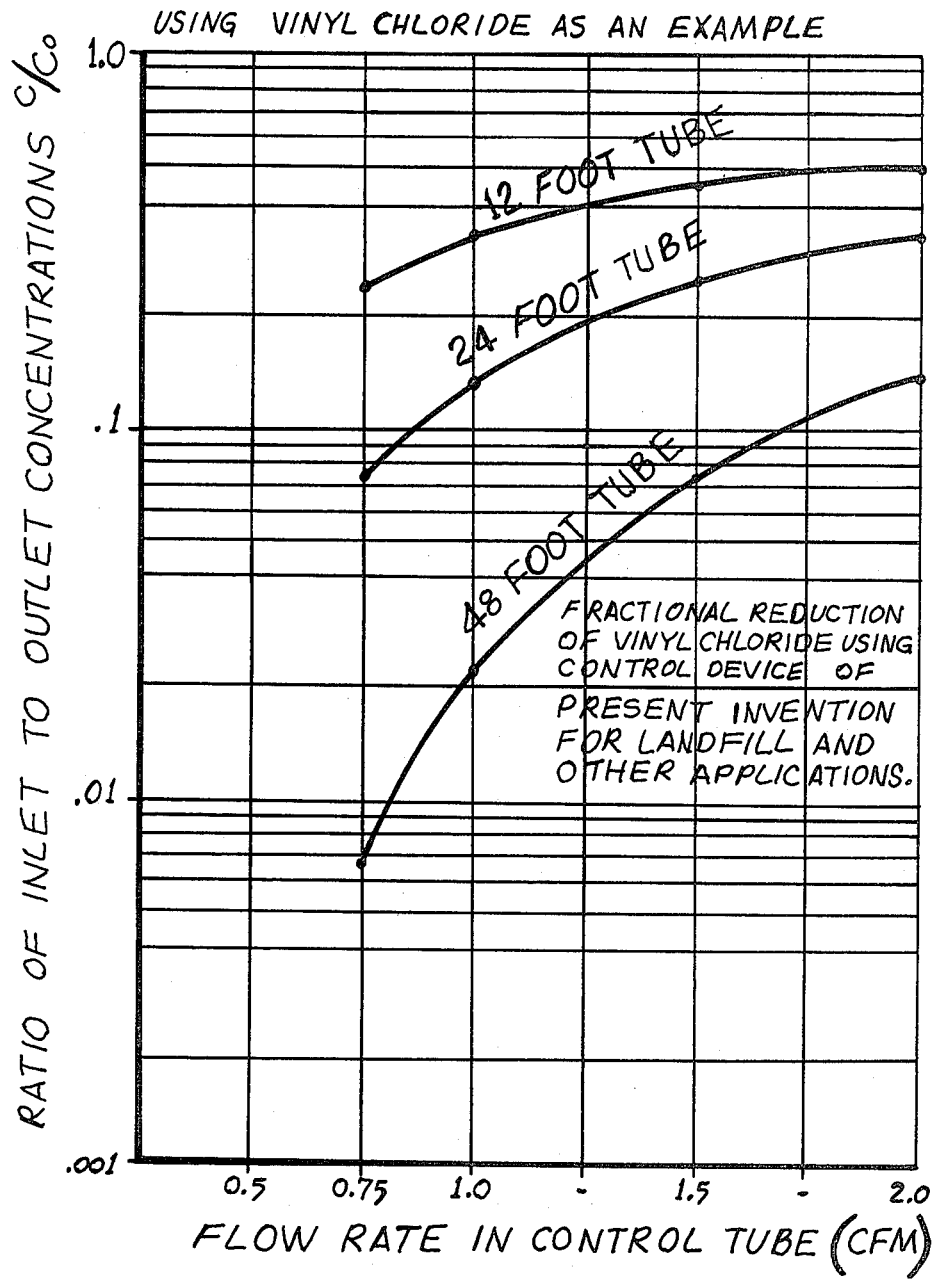

FIG. 4 is a graph indicating the fractional reduction of a typical toxic contaminant, vinyl chloride, using the device of the present invention for land fill and other applications.

DETAILED DESCRIPTION OF THE DRAWINGS

The function of the method and apparatus of the present invention is to remove preselected contaminants, such as vinyl chloride, benzene, toluene and other pollutants, from the gas vented by one or more pipes which are interposed into a land fill.

A land fill, or hazardous waste site, as contemplated for the purpose of the present invention, may comprise any type of garbage, refuse or chemical dump comprising a mixture of organic and non-organic materials, some of which are toxic, at least a portion of which tend to decay and disintegrate chemically in the course of time, emitting various types of organic and non-organic gases and vapors as by-products. Inasmuch as a large portion of dumps of this type comprise organic matter, one of the most common by-products is methane gas which is highly combustible and may tend to migrate underground, or burn or explode if not channeled off in a safe manner. Since many different types of plastic refuse, and various types of chemicals, such as pesticides, defoliants and chemical fertilizers, are ordinarily mixed in with the garbage and other rubbish, or deliberately disposed of in selected dump sites, these products and the by-products from migration, burning or disintegration of such materials, which have been found to be toxic, may be expelled into the atmosphere, causing exposure to large segments of the public.

One common prior art device in widespread use for channeling the methane and organic gases generated in garbage dumps and land fills has included interposing at various points in the fill one or more pipes extending down vertically to depths of, say, 25 or 30 feet. These pipes, which are conventionally from 6 inches to several feet in diameter, may extend down to, but not below, the water table, and serve as vents for the organic and other gases generated in the fill. One means which has been initially tried for purifying the vented emissions has been the use of carbon canisters through which the vented gas streams are passed. Another technique has been the use of flares with the goal of burning off methane, no consideration having been given to the ultimate fate of contaminating vapors present.

Figure 1:
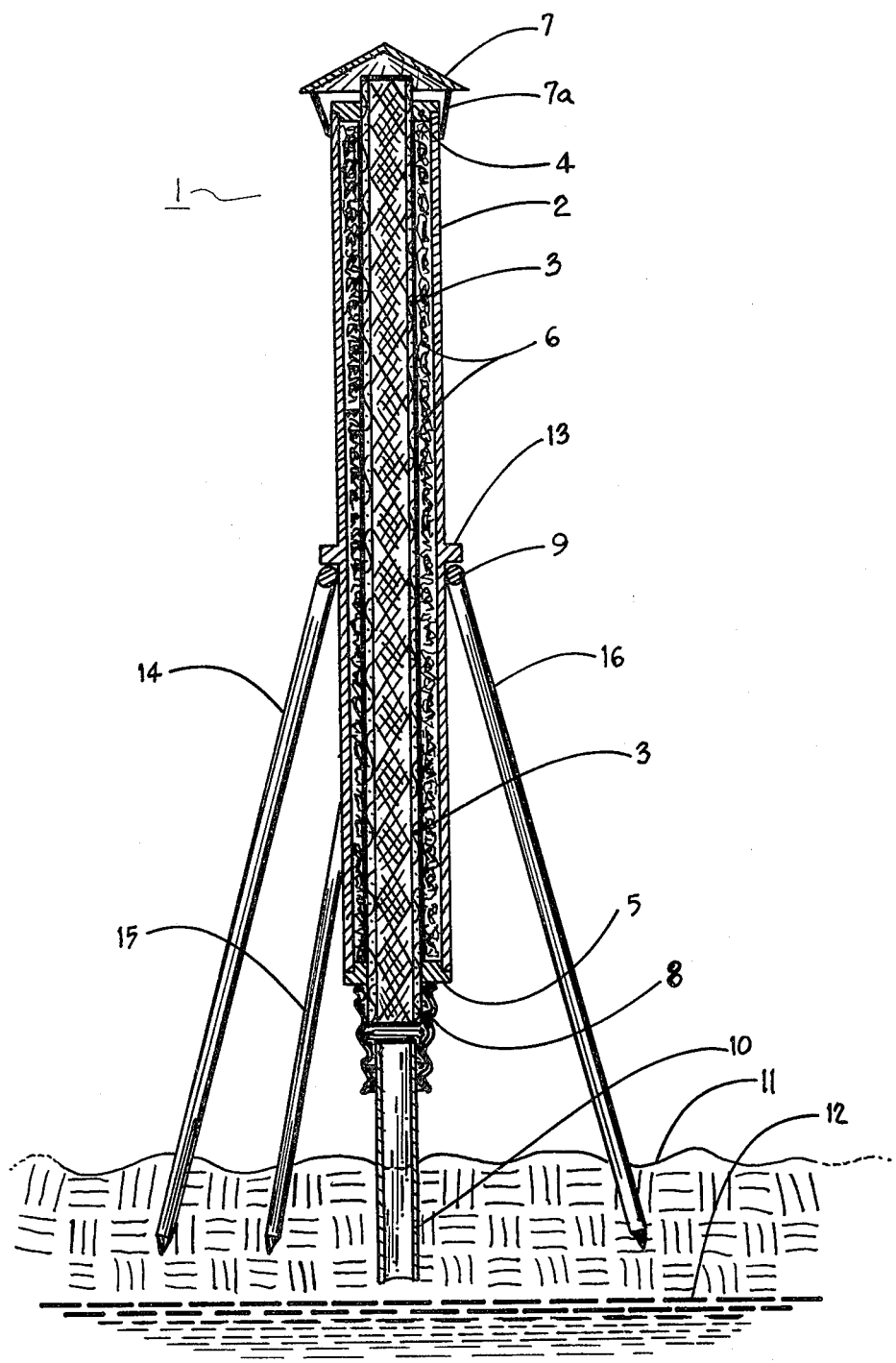
FIG. 1 is a showing, in longitudinal section, of a simplified embodiment of the invention adapted for use in a dump or land fill, in which a single stream of vented gas enters a wire mesh tube making a single pass through the activated charcoal bed before being vented to the atmosphere.

Referring to FIG. 1 of the drawings, there is shown an apparatus in accordance with the present invention including an elemental stripper unit 1 which is installed in substantially vertical relation to a vent 10 which protrudes from the surface 11 of any of the well-known types of garbage dump or land fill.

The elemental stripper unit 1 comprises a wire mesh tube 3, which in the present invention is, say, two inches in diameter and 8½ feet long. The wire mesh tube 3 in the present embodiment is fabricated of, for example, 35 by 35 mesh stainless steel wire. Wire mesh of the type used for the tube 3 can be obtained, for example, from the Newark Wire Mesh Cloth Company of Newark, N.J., and is identified on page 35 of their Catalogue No. WC 730.

The tube 3 is interposed in axial relation to a tubular housing 2, which in the present embodiment is eight feet long and, say, 6 inches in diameter. In the present embodiment, the housing 2 is formed of a thin sheet of steel. Alternatively, the housing 2 can be formed of any rigid material of sufficient strength to support the bed of adsorption material 6, comprising, for example, activated carbon, to be presently described.

In the embodiment under description, the bed 6 of adsorption material is accommodated in the annular space between the inner wall of the housing 2 and the outer wall of the wire mesh screen tube 3. The bed 6 comprises, for example, closely packed activated carbon, say, 8 to 14 mesh, which is substantially larger than the interstices of the wire mesh tube 3. In the embodiment of FIG. 1, in which the internal volume of the annular chamber between wire mesh tube 3 and outer tube 2 is 1.4 cubic feet, the total weight of activated carbon packed into the space is 48.4 pounds. The activated charcoal is made from coconut and wood which has been subjected to controlled burning in a manner well-known in the art. In the present embodiment the charcoal may take the form identified in Technical Bulletin T-561 (1/77) of the catalogue of the Barneby Cheney Company of Columbus, Ohio. Alternatively, the charcoal may be of a conventional type. As a further alternative, the bed 6 of adsorption material may consist essentially of impregnated charcoals and/or reactive granules designed to adsorb and retain specific gases or vapors, such as disclosed, for example, in Technical Bulletin T-561 (1/77) *Activated Charcoal, Purification and Recovery Equipment,* published by Barneby-Cheney of Columbus, Ohio 43216. Examples of specific types which may be preferred for the purposes of the present invention are type CR* designed to adsorb sulphur dioxide, hydrogen chloride, chlorine gas and other acid gases and the halogens, and CK* which is designed to adsorb mercury.

The lower end of the wire mesh tube 3 is coupled by means of inert flexible coupling 8 to the end of the solid tube 10 which extends up from the depths of the fill 11. This may take the form of a hose of rubber or plastic.

The upper and lower ends of the housing tube 2 are closed by a pair of annular seals 4 and 5, of metal or any other rigid materials, which serve to close the activated carbon chamber and also to hold wire mesh tube 3 in axial relation to housing tube 2. The upper end of wire mesh tube 3 is extended about five inches beyond the seal 4. The conical cover 7, which is removable to service the unit, is supported by conventional-type brackets 7a which may be attached to the outer wall of housing 2. Cover 7 may be formed from a thin sheet of steel, or alternatively, of some other rigid material. Cover 7 extends slightly beyond the side-wall of the housing tube 2, and provides a peripheral clearance of several inches so that the partially purified gas can readily escape into the atmosphere from the upper end of wire mesh tube 3.

The gas stream passes out of the vent tube 10 at the rate of, say, 75 cubic feet per hour, (about 1.5 cubic feet per minute) and enters the wire mesh tube 3 in laminar flow. The contaminants associated with this gas stream diffuse radially, pass through the wire mesh tube 3 and are adsorbed by the activated charcoal bed 6, or by other types of solid sorbents therein. The adsorption capacity for methane, which is the principal constituent of the gaseous stream, is extremely low compared to that for the gaseous contaminants to be removed, which may include, for example, vinyl chloride, mercury, benzene, toluene, and many chlorinated organics of a toxic nature.

The removal process for these contaminants is described mathematically, as follows, by what is known in the art as the Gormley-Kennedy Equation, supra, $$C/C_o = 0.812 \exp(-3.657M) + 0.097 \exp(-22.3M) + 0.032 \exp(-57M) \quad (1)$$

where:

$C$ = concentration of contaminants in gas exiting from upper end of wire mesh tube 3 (for example, in parts per million);

$C_o$ = entering concentration of contaminants in gas derived from vent tube 10 (for example, in units of parts per million);

$M = \pi DL/Q$;

$L$ = length of tube (centimeters);

$Q$ = volumetric flow rate (centimeters cubed per second); and $D$ = diffusion coefficient of specific contaminant being removed, such as vinyl chloride (centimeters squared per second).

Sample calculations applying this equation to the design of devices in accordance with the present invention will be set forth hereinafter.

In this manner, much of the unreacted contaminant, which in the example under description is polyvinyl chloride, is removed from the methane or air stream carrier before the same passes out of the end of wire mesh tube 3.

It will be understood that any number of these devices, substantially in accordance with that shown in FIG. 1, can be simultaneously installed and in operation on land fill vent pipes or other gas emission sources.

Figure 2B:
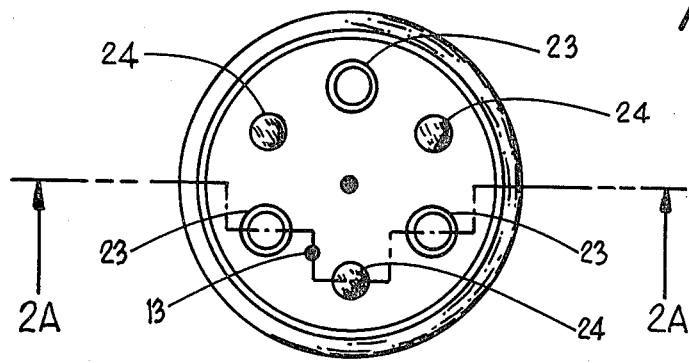
FIGS. 2A and 2B show, in longitudinal and cross-section, an improved embodiment of the present invention for use in a dump or land fill, wherein a plurality of parallel wire mesh tubes are provided for passing several gas streams simultaneously through an enlarged bed of activated charcoal.
Figure 2A:
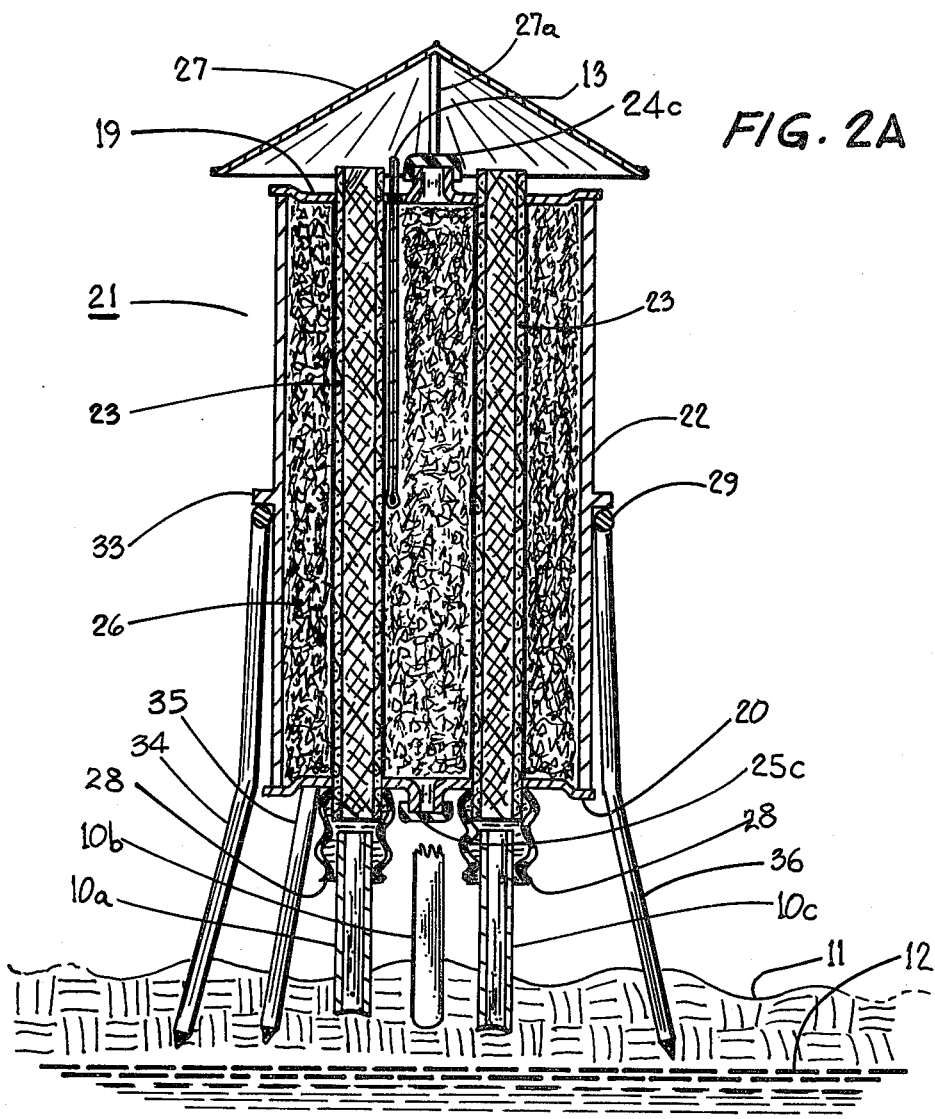

In accordance with another alternative, shown in FIG. 2 of the drawings, instead of the elemental unit disclosed with reference to FIG. 1, there can be substituted a composite unit. This is shown in vertical section in FIG. 2A and in top view, with the cover removed, in FIG. 2B. The unit 21 includes an external cylindrical housing 22 which may take the form, for example, of a drum three feet in diameter, and say, six feet in height, formed out of a relatively thin sheet of steel, or alternatively, of any other rigid material of sufficient strength to contain the solid adsorbent bed 26. The housing 22 may contain any number of wire mesh tubes 23 similar in form to the tube 3 described with reference to FIG. 1. In accordance with the presently described embodiment, three wire mesh tubes 23 are installed in the housing 22, in a symmetrical arrangement, parallel to and surrounding the major axis, being spaced-apart around the axis, for example, at angles of 120°, and each centered at a radial distance about six inches from the axis. Each of these tubes 23 is, say, about 6½ feet in length so that it protrudes several inches beyond the top and bottom plates 19 and 20 of the housing 22 which serve to hold wire mesh tubes 23 in position in gas-tight sealed relation to the internal chamber of housing 22. Thus, each of the wire mesh tubes 23 is in contact externally with the adsorbing bed 26 for a vertical distance of six feet. Referring to the FIG. 2B, it is seen that the top plate 19 includes three additional openings 24, sat, about two inches in diameter, which are incorporated in spaced-apart relation to protruding wire mesh tubes 23. The bottom plate 20, which is substantially the inverse of plate 19, includes a series of vertically matching openings 25. Openings 24 and 25 are designed to enable the activated carbon or other absorbent material to be filled into and drained out of the internal chamber of the housing 22 surrounding the wire mesh tubes 23. Each of the openings 24, 25 in the top and bottom plates 19 and 22 is equipped with a tight-fitting gas-tight seal. A conical weather cover 27, substantially similar to the cover 7, is supported above the upper housing plate 19 on a central supporting means 27a, of FIG. 1. Cover 27, which may be, for example, steel or any other rigid material, extends laterally beyond the periphery of housing 2 providing a lateral clearance with the top of housing 2 so as to allow gas vented from the tubes 23 to escape into the atmosphere.

The lower ends of the wire mesh tubes 23, which protrude through openings in the plate 20, are each coupled to a corresponding one of fill vents 10a, 10b and 10c, by couling means 28 which may, for example, comprise tubing, hosing, or other connecting means which is substantially similar to that disclosed with reference to FIG. 1. Accordingly, in this embodiment three streams of contaminated gas pass simultaneously from the vents 10a, 10b and 10c up into the respective wire mesh tubes 23, passing through the housing 22 which in the present illustrative embodiment is packed with adsorbent material 26 such as activated carbon which may or may not include additional chemical impregnants and/or reactive granules in the manner described with reference to FIG. 1. The gaseous streams passing through the wire mesh tubes 23 will diffuse radially, the contaminants such as, for example, polyvinyl chloride, being adsorbed onto the activated carbon. The three streams of gas are then vented separately through the upper ends of the wire mesh tubes 23, passing out into the atmosphere.

In the present illustrative example, the housing 22 is supported in vertical relation to the vents 10a, 10b and 10c by means of a ring-stand 29 having, say, three symmetrically spaced legs 34, 35 and 36. A lateral flange 33, which may be in the form of a ring or collar which projects from a substantially central portion of the housing 22, rests on and is supported on the upper annular surface of ring stand 29.

In accordance with an additional embodiment of the invention, it is contemplated that instead of having a plurality of separate gas streams passing in parallel wire mesh tubes disposed in the bed of adsorbent material, as disclosed in FIGS. 2A, 2B, the apparatus can be modified in the manner shown in FIGS. 3A, 3B, so that, except for an input end connected to a single vent 10, and a single output at the upper end of the apparatus, the wire mesh tubes 43 are all inter-connected in series at their upper and lower ends by gas-tight couplings 40 and 41, providing a single, multiple-pass wire mesh tube path through the bed of adsorbent material. By inter-connecting the tubes 43 in series, the net effect is to increase the M factor in the Gormley-Kennedy equation (1) supra, thereby substantially enhancing the amount of contaminant adsorbed during the pass from the vent 10 to the output terminal 43e, and thereby decreasing the amount of contaminant remaining in the stream exiting at the top end of the apparatus. Tubes 43 are inter-connected in series relationship, either internally or externally at their upper and lower ends, by gas-impervious sleeves as shown in FIGS. 3A, 3B. Except for the inter-connection between the tubes, the apparatus is substantially similar in construction to that described with reference to FIGS. 2A, 2B, individual elements in FIGS. 3A, 3B being indicated by designating numbers to which 20 has been added. As with the embodiment of FIGS. 2A, 2B, it will be understood that the apparatus may include any number of wire mesh tubes compatable with the size of the enclosing housing and the quality of the adsorbing bed. By incorporating the modification shown in FIGS. 3A, 3B, the apparatus has been given the flexibility of handling from one to several land fill vents depending on the degree of cleanup needed, or the number of streams requiring cleanup.

Sample calculations of removal rates and capacities are presented for several different embodiments of toxic vapor removal systems constructed in accordance with the present invention to include adsorbent beds of the types described with reference to the previous figures. The calculations are directed to the removal of vinyl chloride as a contaminant, which has a diffusion coefficient $D$ of 0.101 cm.$^3$/sec. as calculated by the method of Gilliland from the kinetic theory of gases.

In the calculations hereinafter, it is assumed that the emission rate from a natural land fill vent is 1 cubic foot per minute. The stream consists essentially of a mixture of methane and air containing 100 parts per million of vinyl chloride contaminant.

CASE I

This employs a single wire mesh tube having a portion in contact with the adsorbent bed which is 8 feet long, the tube being, say, 2 inches in diameter, in a structure substantially as described with reference to FIG. 1 of the drawings, for removing toxic vinyl chloride from the land fill stream.

Substituting in the Gormley-Kennedy Equation, (equation (1) hereinbefore):

$$C/C_o = 0.812 \exp(-3.657\,M) + 0.097 \exp(-22.3M) + 0.032 \exp(-57M) \quad (2)$$

where:
$C$ = exiting concentration of vinyl chloride (ppm);
$C_o$ = entering concentration of vinyl chloride (ppm);
$M = \pi DL/Q$ (dimensionless);
$L$ = length of tube (cm);
$Q$ = volumetric flow rate (cm$^3$/sec.);
$D$ = diffusion coefficient of vapor or gas (in this case, vinyl chloride) (cm$^2$/sec.);

For Case I:

$$M = \pi DL/Q; \quad (4)$$

$$M = \frac{(3.14)\,(0.101)\,(8)\,(12)\,(2.54)}{(1)\,(28.32)\,(1/60)\,(10^3)}$$

$$M = 0.1638.$$

Substituting (4) in (2):

$$C/C_o = 0.812 \exp[(3.657)(0.1638)] + 9.097 \exp[(-22.3)(0.1638)] + 0.032 \exp[(-57)(0.1638)] \quad (5)$$

$$C/C_o = 0.446 + 0.0003 \quad (6)$$

But $C_o = 100$; therefore:

$$C \approx 0.446\,(100) = 44.6 \text{ ppm.} \quad (7)$$

Calculating the Reynolds Number $N_{RE}$ for a two inch diameter tube, to ensure that laminar flow exists:

$$\text{Reynolds No.} = N_{RE} = \frac{d\rho V}{\mu} = \frac{4\rho Q}{\pi d \mu}$$

where:
$Q$ = volumetric flow rate = 1 cf/m = 28.32 liters/min.
$\rho$ = density of air $\approx 1.02 \times 10^{-3}$ gm/cm$^3$
$d$ = diameter wire mesh screen = 2 inches
$\mu$ = viscosity of air $\approx 1.7 \times 10^{-4}$ gm/cm sec.
Substituting in (8):

$$N_{RE} \approx \frac{(4)\,(1.02 \times 10^{-3})\,(28.32 \times 10^3)}{(3.14)\,(2)\,(2.54)\,(1.7 \times 10^{-3})\,(60)} \quad (9)$$

$$N_{RE} \approx 71.$$

This is much less than 2000, and is therefor acceptable, since flows are deemed to be laminar up to Reynolds' numbers not exceeding 2000.

Using two of these units in series:

|  | $C_o$ | C |
|---|---|---|
| 1st pass: | 100 ppm | 44.6 ppm |
| 2nd pass: | 44.6 ppm | 19.9 ppm |

This achieves an overall fractional reduction of vinyl chloride of 19.9/100 or 0.199.

It can be shown by simple calculations that with the emission removal rate indicated above, about 5.73 grams per day of vinyl chloride contaminant would collect on the charcoal in the first tube of this embodiment. Therefor, it is estimated that the charcoal in the tube would only need to be replaced after the device was in use for 158 days.

CASE II

This is based on a multiple tube modification of the present invention having a structure substantially similar to that shown in FIGS. 2A, 2B and 3A, 3B including an adsorbent bed of the type described with reference to those figures, except that it contains eight wire mesh tubes, each having a vertical height of six feet in contact with the adsorbent bed, and a diameter of one inch. In this unit, the volume of charcoal in the adsorbent bed is estimated to be 1455 pounds. These modified embodiments illustrate three distinct field applications:

Case A employs one 48 foot long wire mesh tube resulting from the series coupling in end-to-end relation of eight wire mesh tubes, each six feet long, as indicated in the foregoing paragraph.

Case B employs two 24 foot long wire mesh tubes resulting from end-to-end coupling of two series of four wire mesh tubes, each six feet long, as indicated above, which are coupled to two separate vents.

Case C employs four 12 foot long wire mesh tubes resulting from the end-to-end coupling of four series of two wire mesh tubes, each six feet long, separately coupled to four vents.

Assuming for each of the Cases II A, B and C, that the gas stream vented from the land fill is a mixture of methane and air containing an initial concentration $C_o$ of vinyl chloride of 100 parts per million, the following table summarizes the fractional reduction of contaminant $C/C_o$ as a function of flow rate Q, and total tube length L.

| SUMMARY TABLE FOR CASE II APPLICATION FRACTIONAL REDUCTION FOR CONTAMINANT AS FUNCTION OF Q & L: $C/C_o$ | | | |
|---|---|---|---|
| Q (CFM) | 12 FT. LENGTH | 24 FT. LENGTH | 48 FT. LENGTH |
| 0.75 | 0.245 | .074 | .0067 |
| 1.0 | 0.331 | 0.135 | .0220 |
| 1.5 | 0.446 | 0.245 | .0739 |
| 2.0 | 0.518 | 0.331 | 0.135 |

As in Case I, with the wire mesh tubes one inch in diameter for the modification of Case II, it can be shown that the Reynolds number $N_{RE}$ for this unit is many orders of magnitude less than 2000, this insuring laminar flow.

The fractional reduction of vinyl chloride contaminant $C/C_o$ as a function of flow rate in cubic feet per minutes as shown graphically in FIG. 4 of the drawings for control units operated in accordance with the three embodiments described with reference to Cases II A, B and C in the foregoing paragraphs.

Although the invention has been described by way of illustration with reference to gas vented from land fills or dumps, it will be understood that control devices in accordance with the present invention can be applied, as well, to decontaminating gas from other fugitive sources producing laminar flows having Reynolds' numbers not exceeding 2000.

It will be understood that the invention is not limited to the specific apparatus or any part thereof shown and described by way of illustrating the invention, but only by the scope of the appended claims.

What I claim is:

1. A system for removing contaminants from a gas stream vented from a land fill or other fugitive gas source which comprises in combination:
    at least one vent pipe interposed to channel gas from said land fill or other fugitive gas source;
    a housing enclosing at least one wire mesh tube substantially spaced apart from the inner wall of the housing to form a chamber surrounding said wire mesh tube;
    said chamber being packed with adsorbing material having a minimum cross-sectional dimension which exceeds the interstices of said wire mesh;
    said chamber being closed at the ends except for openings to accommodate at least one said wire mesh tube and openings for removing and replacing said adsorbing material;
    means for supporting said housing so that at least one said wire mesh tube is maintained at one of its ends in coupled relation to receive a gas stream in flow from at least one said vent pipe;
    the other end of said wire mesh tube communicating with means protruding through the upper surface of said housing for directing said gas stream into the atmosphere after one or more passes through at least one said wire mesh tube, whereby said contaminants are radially diffused through the interstices of said wire mesh tube to become adsorbed onto said adsorbing material while the remainder of said gas stream passes in axial direction through said at least one wire mesh tube without substantial contact with said adsorbing material.

2. The combination in accordance with claim 1 in which said adsorbing material consists essentially of activated carbon treated with one or more additional chemicals or reactive granules designed to remove specific contaminants from the gas stream vented from said land fill or other fugitive source.

3. The combination in accordance with claim 2 wherein said adsorbing material comprises reactive impregnated granules, types CR* or CK*, or a combination thereof, as identified in technical bulletin T-561 (1/77) entitled Activated Charcoal Purification and Recovery Equipment, published by Barnebey-Cheney, Columbus, Ohio 43216.

4. The combination in accordance with claim 1 wherein said housing is cylindrical in form enclosing a single wire mesh tube in axial relation to said housing; and
    wherein said chamber, packed with said adsorbing material is annular in form.

5. The combination in accordance with claim 1 wherein said housing encloses a plurality of wire mesh tubes disposed in substantially parallel relation to the principal axis of said housing;

the combination including support means for supporting said housing adjacent to a plurality of said vent pipes from said land fill or other fugitive source;

means at the lower end of said housing for separately coupling one end of each of said wire mesh tubes to receive a gas stream in laminar flow from a corresponding one of said vent pipes; and means at the upper end of said housing for separately venting each of said wire mesh tubes to the atmosphere.

6. The combination in accordance with claim 1 wherein said housing encloses a plurality of wire mesh tubes disposed in substantially parallel relation to the principal axis of said housing;

said wire mesh tubes being interconnected in series at alternate ones of their upper and lower ends to form a single continuous conduit coupled at one end to one said vent pipe, and venting to the atmosphere at the other end of said continuous conduit, whereby said continuous conduit makes multiple passes through said adsorbent bed.

7. The combination in accordance with claim 1 wherein said housing encloses a plurality of wire mesh tubes, selected ones of their upper and lower ends being connected together to form more than one continuous conduit, each coupled at one of its ends to a respective one of said vent pipes, and each said conduit separately venting to the atmosphere at its other end, whereby each said conduits makes multiple passes though said adsorbent bed.

8. The combination in accordance with either of claims 4, 5, 6 or 7 wherein said housing has a peripheral lateral flange;

said supporting means comprises a stand having legs interposed into said fill; and said flange is seated on said stand.

9. The combination in accordance with either of claims 4, 5, 6 or 7 which comprises a weather cover supported in spaced-apart relation to the upper end of said housing providing a peripheral vent at its edge for gas vented through one or more of said wire mesh tubes.

10. The combination in accordance with claim 1 wherein means including said at least one wire mesh tube is constructed and arranged to provide a path characterized by a Reynolds number not exceeding about 2000 for receiving a gas stream in laminar flow from said at least one vent pipe and maintaining said laminar flow as said gas stream passes in an axial direction through said at least one wire mesh tube to the atmosphere without substantial contact with said adsorbing material.

11. The method of removing contaminants from gas vented from a land fill or other fugitive gas source which comprises the steps of:

interposing adjacent one or more vent pipes from said land fill or other fugitive gas source, a housing enclosing at least one wire mesh tube substantially spaced-apart from the inner wall of said housing to form a chamber;

packing said chamber surrounding at least one said wire mesh tube with a bed of adsorbing material having a minimum cross-sectional dimension which substantially excceds the interstices of said at least one wire mesh tube;

coupling said at least one wire mesh tube to at least one corresponding vent pipe for receiving a stream of gas vented in laminar flow from said land fill or other fugitive source for at least one pass through said wire mesh tube, whereby said contaminant is diffused radially, passing through the interstices of said wire mesh tube and becoming adsorbed into said adsorbing material, and whereby the remainder of the gas in said stream passes axially along said at least one wire mesh tube making substantially no contact with said adsorbing material; and venting the stream of gas to the atmosphere after at least one pass through said at least one wire mesh tube.

12. The method in accordancd with claim 11 wherein said adsorbent material consists essentially of activated carbon.

13. The method in accordance with claim 12 wherein said adsorbing material consists essentially of activated carbon impregnated with chemicals or reactive granules designed to remove specified contaminants.

14. The method in accordance with claim 11 wherein a plurality of said wire mesh tubes is interposed in said housing in substantially parallel relation to the principal longitudinal axis of said housing.

15. The method in accordance with claim 14 wherein each of said wire mesh tubes is separately connected to one of said vent pipes and separately vents to the atmosphere.

16. The method in accordance with claim 14 wherein the wire mesh tubes of said plurality are disposed in interconnected series relation to form a single conduit coupled at its input end to receive said stream of gas from one of the vents in said fill or other fugitive source and to expel said gas stream to the atmosphere at its output end after a plurality of passes through said housing.

17. The method in accordance with claim 14 wherein the wire mesh tubes of said plurality are connected together at selected ones of their upper and lower ends to form more than one continuous conduit, each said conduit coupled at one of its ends to a respective one of said vent pipes, and each said conduit separately venting to the atmosphere at its other end, whereby each of said conduits makes multiple passes through said adsorbent bed.

* * * * *